3,007,965
NEW TETRACYCLINES PRODUCED BY STREPTOMYCES AUREOFACIENS

John Andrew Growich, Jr., and Philip Andrew Miller, New City, N.Y., assignors to American Cyanamid Company, New York, N.Y., a corporation of Maine
No Drawing. Filed Feb. 13, 1959, Ser. No. 792,952
7 Claims. (Cl. 260—559)

This invention relates to the production of a new tetracycline-related compound which has the following structural formula:

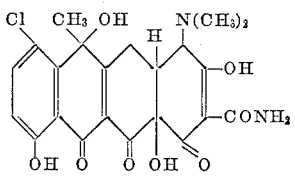

An appropriate chemical name for the new chlortetracycline analogue of this invention, according to Chemical Abstracts nomenclature, is 7-chloro-4-dimethylamino-1,4,4a,5,6,11,12,12a - octahydro - 3,6,10,12a - tetrahydroxy-6-methyl-1,11,12-trioxo-2-naphthacenecarboxamide. An appropriate common name for the new compound would be 7-chloro-5a(11a)-dehydrotetracycline and it will be so referred to in the specification and claims.

The new compound of the present invention is produced by certain mutant strains of S. aureofaciens. The new mutant strains are species of S. aureofaciens since they are all direct descendants of the chlortetracycline-producing S. aureofaciens A377 soil isolate described in U.S. Patent to Duggar No. 2,482,055, and deposited at the Northern Regional Research Laboratories, Peoria, Illinois, and indexed as NRRL 2209. Derivation of the new strains of S. aureofaciens from the original A377 isolate involved treatment of A377 with mutagenic agents including ultraviolet irradiation, nicotine, and nitrogen mustard. Spontaneous mutation of chlortetracycline-producing strains of S. aureofaciens may result in strains which will produce the new compound of this invention.

The original strain of S. aureofaciens, which we have designated as S1308, which produces the new compound is somewhat unstable. When subcultured it rapidly degenerates to a mixed culture from which may be isolated a number of more stable variants of different appearance. In general, all of these strains are characteristic of the special S. aureofaciens, but differ somewhat among themselves and from previously described strains of S. aureofaciens, primarily in pigmentation. Practically all of the strains show a characteristic ultraviolet fluorescence at 3600 A. when grown on agar and corn steep media.

While the principal manner in which the new strain of S. aureofaciens and its variants differ from previously described strains of S. aureofaciens is in the nature of the compound produced, the strains studied so far differ somewhat in pigmentation on various culture media as shown below.

COMPARISON OF DIFFUSIBLE FLUORESCENT PIGMENTS IN AGAR MEDIA

| Strain | Q4 agar | AP4 agar |
|---|---|---|
| A377 | None | None. |
| S1308 | Bright yellow-green | Bright yellow-green. |

Formulation of Q4 agar:
Sucrose _____ grams__ 10
MgSO$_4$.7H$_2$O _____ do____ 0.25
KH$_2$PO$_4$ _____ do____ 4
(NH$_4$)$_3$PO$_4$ _____ do____ 2
Corn steep _____ milliliters__ 7.5
Crude agar _____ grams__ 30
H$_2$O, q.s. 1000 milliliters.
pH adjusted to 6.5.

Formulation of AP4 agar:
Sucrose _____ grams__ 10
MgSO$_4$.7H$_2$O _____ do____ 0.25
KH$_2$PO$_4$ _____ do____ 2
(NH$_4$)$_3$PO$_4$ _____ do____ 2
Corn steep _____ do____ 4
Bacto (refined) agar _____ do____ 20
H$_2$O, q.s. 1000 milliliters.

Formulation of AP6 agar: Same as AP4 agar, except corn steep level is 6 grams per liter.

Strain S1308 grows vigorously on Q4 agar, producing abundant deep gray spores. On AP4 and AP6 agar, the typical colony is heavily pigmented deep brown-yellow becoming brown to brown-red by incandescent light, entire but with a diffuse margin, convex and smooth, becoming papillated in the center with age.

Growth and culture of the original S1308 isolate has led to the observation and isolation of a number of off-types of different appearance, ranging in color from white to pale yellow, deep orange, light brown, and the typical brown-yellow and brown-red. All show the characteristic ultraviolet fluorescence at 3600 A. with the exception of the white offtypes.

To illustrate the color variations in the new strains of S. aureofaciens which produce the new tetracycline-related compound, four selected strains were grown on corn steep agar and the following observations were made.

COLOR OBSERVATIONS:[1] S. AUREOFACIENS: AP4 CORN-STEEP AGAR: SIX DAY INCUBATION AT 26.5° C.

| Strain | Single colonies | Mass growth |
|---|---|---|
| S1308 | Copper brown | Dark brown. |
| S1308-V146 | Cedar | Dark redwood. |
| S1308-V237 | Dark luggage tan | Amber. |
| S1308-29 | Orange rust | Orange rust. |

[1] Colors according to the Color Harmony Manual, Third Edition, Container Corporation of America.

COLOR OBSERVATIONS:[1] S. AUREOFACIENS: AP6 CORN-STEEP AGAR: SIX DAY INCUBATION AT 26.5° C.

| Strain | Single colonies | Mass growth |
|---|---|---|
| S1308 | Henna to dark brown | Dark brown. |
| S1308-V146 | Sandalwood | Chestnut brown. |
| S1308-V237 | Dark luggage tan | Dark luggage tan. |
| S1308-29 | Oak brown | Oak brown. |

[1] Colors according to the Color Harmony Manual, Third Edition, Container Corporation of America.

The mutant strains which produce the new compound of the present invention possess the same general characteristics as do the strains which produce the tetracyclines and differ among themselves in the same general manner that the tetracycline-producing and chlortetracycline-producing strains differ from each other, as has been described in a number of scientific papers which have been published. The data appearing below will serve to illustrate the variation of Strain S1308 from the original A377 strain available as NRRL 2209.

*Streptomyces aureofaciens* Strain S1308 was differentiated from *Streptomyces aureofaciens* Strain A377 (NRRL 2209) by observation of growth characteristics on various media incubated at 26.5° C.

(1) *Glycerol asparagine beef extract agar*

| | | |
|---|---|---|
| Glycerol | percent | 1.0 |
| L-asparagine | do | 0.05 |
| Beef extract | do | 0.2 |
| KH$_2$PO$_4$ | do | 0.05 |
| Bacto agar | do | 1.5 |
| Distilled water, q.s. | do | 100.0 |
| pH adjustment with 50% KOH | | 7.0 |
| Post sterilization pH | | 7.2 |

| | *Streptomyces aureofaciens* | |
|---|---|---|
| | Strain S1308 | Strain A377 |
| Growth | Good, camel [1] | Good. |
| Aerial hyphae | Slight to moderate white to gray. | Slight to fair, white to light gray. |
| Sporulation | Fair at gray foci | Light gray. |
| Diffusible pigment. | Light to yellow-green | Light yellow. |
| Reverse | Camel to light brown | Yellow to light orange-yellow. |

[1] Color Harmony Manual, Third Edition, Container Corporation of America.

(2) *Dextrin Czapek-Dox agar*

| | | |
|---|---|---|
| Dextrin | percent | 1.0 |
| NaNO$_3$ | do | 0.2 |
| K$_2$HPO$_4$ | do | 0.1 |
| MgSO$_4$.7H$_2$O | do | 0.05 |
| KCl | do | 0.05 |
| FESO$_4$.7H$_2$O | do | 0.001 |
| Bacto agar | do | 1.5 |
| Distilled water, q.s. | do | 100.0 |
| Post sterilization pH | | 7.2 |

| | *Streptomyces aureofaciens* | |
|---|---|---|
| | Strain S1308 | Strain A377 |
| Growth | Poor, hyaline | Good. |
| Aerial hyphae | None | Abundant, mouse gray [1] to lead gray,[1] water-white surface globules. |
| Sporulation | do | Profuse. |
| Diffusible pigment. | do | Trace: pale yellow. |
| Reverse | Trace of pigment, red-orange. | Apigmentous, pink trace. |

[1] Color Harmony Manual, Third Edition, Container Corporation of America.

(3) *AP4 cornsteep agar*

| | | |
|---|---|---|
| Cornsteep | percent | 0.4 |
| Sucrose | do | 1.0 |
| MgSO$_4$.7H$_2$O | do | 0.025 |
| KH$_2$PO$_4$ | do | 0.2 |
| (NH$_4$)$_2$HPO$_4$ | do | 0.2 |
| Bacto agar | do | 2.0 |
| Tap water, q. s. | do | 100.0 |
| Post sterilization pH | | 6.5 |

| | *Streptomyces aureofaciens* | |
|---|---|---|
| | Strain S1308 | Strain A377 |
| Growth | Good | Excellent. |
| Aerial hyphae | Moderate to abundant fawn.[1] | Abundant, fawn.[1] |
| Sporulation | Abundant, uniform | Profuse, uniform. |
| Soluble pigment | Deep orange-brown with yellow-green overcast. | Light yellow to amber. |
| Reverse | Chocolate brown [1] | Light tan.[1] |

[1] Color Harmony Manual, Third Edition, Container Corporation of America.

(4) *Other agar media*

| Medium | *Streptomyces aureofaciens* | |
|---|---|---|
| | Strain S1308 | Strain A377 |
| Nutrient agar | Fair growth: putty [1] to mustard brown.[1] No aerial hyphae. Reverse: putty [1] becoming mustard brown.[1] No soluble pigment. | Good growth. No aerial hyphae. Reverse: pale yellow. Pale yellow soluble pigment. |
| Glucose asparagine meat extract. | Abundant growth: cinnamon [1] to dark luggage tan.[1] Abundant aerial hyphae: white to fawn. Sporulation: abundant. Reverse: dark luggage tan. Orange-brown soluble pigment. | Good growth. Aerial hyphae white becoming increasingly gray with increase with spore formation. Reverse: light yellow to pink-orange. Trace: yellow-orange soluble pigment. |
| AP4 cornsteep agar. | Good growth: camel [1] to oak brown.[1] Good to abundant aerial hyphae: fawn.[1] Sporulation: good to abundant. Reverse: chocolate brown.[1] Deep orange-brown pigment soluble pigment with yellow-green overcast. | Excellent growth. Profuse aerial mycelium. Profuse sporulation: fawn.[1] Reverse: light tan.[1] Light yellow to amber soluble pigment. |
| AP6 cornsteep agar. | Abundant growth: brick red [1] to copper brown.[1] Abundant to profuse aerial hyphae: beige.[1] Abundant sporulation. Reverse: chocolate brown.[1] Deep red-brown soluble pigment with yellow-green overcast. | Excellent growth. Profuse aerial mycelium. Profuse sporulation: fawn.[1] Reverse: tan.[1] Light amber soluble pigment. |
| Q4 agar | Excellent growth: copper-brown [1] to chocolate brown.[1] Profuse aerial mycelium: beige.[1] Profuse sporulation. Reverse: chocolate brown.[1] Very deep red-brown soluble pigment with yellow-green overcast. | Excellent growth: pale yellow. Profuse aerial mycelium: dark brown.[1] Profuse sporulation. Reverse: orange to orange-yellow. Orange-brown soluble pigment. |
| Potato slants | Profuse, moist, smooth nodulated growth: orange rust [1] to deep brown [1] to light brown.[1] No soluble pigment. | Profuse, moist, smooth, nodulated growth: light brown yellow [1] to beige [1] to cedar.[1] No soluble pigment. |
| Purple milk | Slight but definite brite chartreuse yellow [1] growth collar. Apparent partial peptonization but little significant pH change. | Slight white to pale yellow growth collar. Little significant pH change nor apparent peptonization in 14 days. |

[1] Color Harmony Manual, Third Edition, Container Corporation of America.

(5) *Microscopic observations*

| Medium | *Streptomyces aureofaciens* | | | |
|---|---|---|---|---|
| | Strain S1308 | | Strain A377 | |
| | Mycelium | Spores | Mycelium | Spores |
| Glycerol asparagin meat extract agar. | Flexuous, continuous, branched. Diam. 1.2$\mu$-2.0$\mu$. | Spheroidal to ovoidal. Diam. 1.2-1.5 $\mu$. | Flexuous, continuous, branched. Diam. 1.0$\mu$-1.2$\mu$. | Spheroidal to ovoidal. Diam. 1.2-1.5 $\mu$. |
| AP4 cornsteep agar. | Flexuous, continuous, branched. Diam. 0.8$\mu$-1.0$\mu$. | do | Flexuous, continuous, branched. Diam. 0.8$\mu$-1.0$\mu$. | Do. |

Mycelial and spore morphology for Strain S1308 is apparently similar to that observed for Strain A377. Both strains demonstrate continuous, flexuous, branched, mycelium with an occasional tendency of aerial hyphae towards spiraling. Characteristic spores are ovoidal to spheroidal in shape.

Viable cultures of *S. aureofaciens* Strain S1308 and several of its variants which produce the new compound of this invention have been deposited with the American Type Culture Collection at Washington, D.C., and have been assigned accession numbers ATCC No. 12748 to strain S1308, ATCC No. 12749 to strain S1308–29, ATCC No. 12750 to strain S1308–V146, and ATCC No. 12751 to strain S1308–V237.

The antibacterial activity of the new compound toward

*Staphylococcus aureus* is not in excess of 0.5% of that of chlortetracycline. However, the new tetracycline-related compound is remarkably stable toward alkali whereas chlortetracycline is known to be alkali unstable. The half destruction time in 0.1 N NaOH at 25° C. for 7-chloro-5a(11a)-dehydrotetracycline hydrochloride is greater than 50 hours while chlortetracycline hydrochloride under the same conditions has a half life of only 1.6 minutes. This increased stability is a real advantage in that it makes it possible to improve the refining and recovery procedures from the mash since more drastic pH and temperature conditions can be employed and the efficiency of various steps in the process can thereby be improved.

One of the important advantages of the new compound is that it can be converted by a reductive dechlorination process into the well-known broad-spectrum antibiotic tetracycline. A suitable catalytic reductive dechlorination process for accomplishing this conversion is more particularly described and claimed in the copending application of Philip A. Miller, Serial No. 650,822, filed April 5, 1957.

It is also possible to effect a biological conversion of the 7-chloro-5a(11a)-dehydrotetracycline of this invention to the broad-spectrum antibiotic chlortetracycline. This conversion may be accomplished by adding crystals of 7-chloro-5a(11a)-dehydrotetracycline to a fermentation utilizing conventional chlortetracycline-synthesizing strains of *S. aureofaciens*. A suitable biological process for accomplishing this conversion forms the subject matter of the copending application of McCormick, Sjolander and Hirsch, Serial No. 650,820, filed April 5, 1957, now Patent Number 2,965,546.

The conditions of the fermentation with the new mutant strains of *S. aureofaciens* of this invention are generally the same as for the presently known methods of producing chlortetracycline by fermentation. That is, the fermentation medium contains the usual nutrients and mineral substances. Suitable nutrient substances include starch, dextrose, cane sugar, glucose, molasses, soybean meal, peanut meal, yeast, meat extracts, peptone, ammonium sulfate, urea, corn steep liquor, distillers solubles, fish meal and other conventional substances. The inorganic salts include such things as calcium carbonate, ammonium sulfate, ammonium chloride, and the various trace elements such as manganese, cobalt, zinc, copper, iron and the like.

The other general conditions of the fermentation such as hydrogen ion concentration, temperature, time, rate of aeration, preparation of the inoculum, sterilization, inoculation and the like are conventional and may be similar to those for the production of chlortetracycline shown in the U.S. Patent to Duggar No. 2,482,055.

There is one point of departure from the chlortetracycline fermentation conditions, however, that is of considerable significance. The new mutant strains of *S. aureofaciens* appear to be riboflavin-deficient organisms and hence the yields are low when fermentations are carried out with media low or lacking in riboflavin. For example, fermentation with a conventional corn steep medium but with no added riboflavin will produce 2500 to 4000 gammas per milliliter of the new compound. The addition of trace amounts of riboflavin to this medium will result in a potency increase. Therefore, we prefer to use a corn steep medium high in riboflavin and to that extent we have found that when the medium contains from about 0.1 to 2.0 parts per million added riboflavin, the potency of the mash assays as high as 8000 to 10,000 gammas per milliliter, from which it will be evident that the new mutants are high-yielding strains.

During the fermentation small amounts of chlortetracycline and tetracycline are also produced. Usually the amounts are not great enough to interfere with the principal product of the fermentation nor to warrant any separate recovery step since they are usually present in the fermentation only to the extent of about 200–400 gammas per milliliter, although the relative proportion of these compounds may vary considerably depending upon the particular mutant strain medium and fermentation conditions used.

It has also been observed that if the fermentation medium is low in available chloride ion (cf. U.S. Patent to Minieri et al. No. 2,734,018) there is produced by the new mutant strains of *S. aureofaciens* an unchlorinated analogue of the new compound of this invention. The new analogue may be termed 5a(11a)-dehydrotetracycline and as will be apparent it is identical to the chlorinated compound, the structural formula of which is shown hereinbefore, except that it lacks a chlorine atom in the 7-position of the naphthacene ring. The unchlorinated analogue may be catalytically reduced to tetracycline the same as described above in connection with the chlorinated compound. Similarly, the unchlorinated analogue may be converted biologically to tetracycline by suitable fermentation procedures.

In order to produce this novel unchlorinated compound, it is necessary only to modify the fermentation medium in the manner specified in the aforesaid Minieri et al. patent so that the resulting medium is low in available chloride, that is, it contains less than about 50 parts per million of chloride ion. By carrying out the fermentation in this chloride-restricted medium with the new mutant strains 5a(11a)-dehydrotetracycline may be produced.

It has also been observed that if the fermentation media contains substantial quantities of bromide ions there is produced by the new mutant strains of *S. aureofaciens*, a bromo analogue of the new compound of this invention. The new analogue may be termed 7-bromo-5a(11a)-dehydrotetracycline and as will be apparent it is identical to the chlorinated compound, the structural formula of which is shown hereinabove, except that it has a bromine atom in the 7-position of the naphthacene ring instead of a chlorine atom. This new compound may also be catalytically reduced to tetracycline the same as described above in connection with the chlorianted and unchlorinated compounds. Similarly, it may be converted biologically to bromtetracycline by suitable fermentation procedures.

In order to produce this novel analogue, it is necessary only to modify the fermentation medium in the manner specified in the copending application of A. P. Doerschuk et al. Serial No. 580,663, filed April 25, 1956, entitled Production of Antibiotic II, so that the resulting medium contains at least 50 parts per million and preferably 100–1500 parts per million of bromide ions and not more than 50 parts per million of chloride ions. [See also the Journal of the American Chemical Society 78, 1508 (1956).] By carrying out the fermentation in this bromide-ion-containing medium with the new mutant strains of *S. aureofaciens* of this invention, 7-bromo-5a(11a)-dehydrotetracycline may be produced.

The 7-chloro-5a(11a)-dehydrotetracycline may be isolated from the fermentation mash by any convenient means. A preferred procedure involves a chromatographic separation in which the fermentation mash is acidified by adjusting the pH to from 1 to 2 with a suitable acid such as hydrochloric acid, sulfuric acid, etc. The mash is then filtered and the acidified aqueous filtrate containing the activity is contacted with an alcohol, such as n-butanol, for example, to form an alcoholic extract of the activity. The extract is concentrated and then chromatographed on a diatomaceous earth column in the usual manner and the column is developed with a mixture of 80% n-butanol and 20% chloroform. The eluted fractions are concentrated and freeze-dried. The crude freeze-dried material is dissolved in methanol and crystallization of the compound in the neutral form takes place rapidly. The crystals are filtered, washed and vacuum dried in the usual manner. Any residual chlortetracycline and tetracycline that may be present can be removed by a recrystallization procedure involving dissolving the compound in acidified methanol, filtering, neutralizing with mild alkali and crystallizing out purified 7-chloro-5a(11a)-dehydrotetracycline.

The new compounds form salts of the same type and in the same general manner as do the known tetracyclines, that is, the mineral acid salts, the alkali metal salts and the alkaline earth metal salts of the new compounds may readily be prepared. Thus, the mineral acid salts may be prepared by treatment with acids such as hydrochloric acid at a pH of less than about 4. The free base may be obtained at a pH within the range of about 4 to 7. The alkali metal and alkaline earth metal salts may be simply formed by treating the amphoteric compound with approximately one equivalent of the chosen base, i.e. sodium hydroxide, potassium hydroxide, calcium hydroxide, etc., at a pH of about 7 or higher.

The invention will be described in greater detail in conjunction with the following specific examples in which the yields are expressed as gammas per milliliter ($\gamma$/ml.).

EXAMPLE 1

Spores of a strain of *S. aureofaciens* capable of producing 7-chloro-5a(11a)-dehydrotetracycline, such as strain S1308, are washed from an agar slant with sterile distilled water to form a suspension containing approximately 60–80 million spores per milliliter. A 0.33 milliliter portion of the suspension is used to inoculate a Brewer tube containing 8 milliliters of a medium prepared according to the following formulation:

| Ingredients: | | Amounts |
|---|---|---|
| Sucrose | grams | 30 |
| Ammonium sulfate | do | 2 |
| Calcium carbonate | do | 7 |
| Corn steep | milliliters | 16.5 |
| Tap water q.s. | do | 1000 |

Prior to inoculation, the medium is sterilized for 20 minutes at 15 pounds pressure, during which the pH changes from 6.3 to 6.9. The inoculated shaker tube is then incubated for 24 hours at 28° C., on a reciprocal shaker.

EXAMPLE 2

A medium of the following composition is prepared:

| Ingredients: | | Amounts |
|---|---|---|
| Ammonium sulfate | grams | 5 |
| Ammonium chloride | do | 1.5 |
| Magnesium chloride | do | 2.0 |
| Starch | do | 55 |
| Potassium chloride | do | 1.28 |
| Phosphoric acid | do | 0.4 |
| Calcium carbonate | do | 9.0 |
| Trace element solution | milliliters | 10 |
| Lard oil | do | 20 |
| Water q.s. | do | 1000 |

After sterilization of the nutrient medium, 25 milliliters of the medium in a 250 milliliter Erlenmeyer flask is inoculated with 1 milliliter of inoculum prepared as in Example 1. Fermentation is then carried out for 120 hours at 25° C. on a rotary shaker operating at 180 r.p.m. The mash is assayed fluorometrically and spectrophotometrically, and found to contain 6$\gamma$/ml. of chlortetracycline and 100$\gamma$/ml. of 7-chloro-5a(11a)-dehydrotetracycline.

EXAMPLE 3

Example 2 is repeated using the same medium containing 0.32$\gamma$/ml. of riboflavin. The resulting mash is found to contain 71$\gamma$/ml. of chlortetracycline and 1450$\gamma$/ml. of 7-chloro-5a(11a)-dehydrotetracycline.

EXAMPLE 4

A medium of the following formulation is prepared:

| Ingredients: | | Amounts |
|---|---|---|
| Ammonium sulfate | grams | 5 |
| Calcium carbonate | do | 9 |
| Ammonium chloride | do | 1.5 |
| Magnesium chloride.6$H_2O$ | do | 2 |
| Ferrous sulfate.7$H_2O$ | do | 0.04 |
| Manganese sulfate.4$H_2O$ | do | 0.05 |
| Cobalt chloride.6$H_2O$ | do | 0.001 |
| Zinc sulfate.7$H_2O$ | do | 0.1 |
| Corn steep | do | 25–30 |
| Starch | do | 55 |
| Lard oil | milliliters | 2 |
| Water q.s. | do | 1000 |

After sterilization of the medium in an autoclave, 25 milliliters in a 250 milliliter Erlenmeyer flask is inoculated with 1 milliliter of inoculum prepared as in Example 1. Fermentation is carried out for 120 hours at 25° C. on a rotary shaker operating at 180 r.p.m. The resulting mash is assayed fluorometrically and spectrophotometrically and found to contain 84$\gamma$/ml. of chlortetracycline and 2830$\gamma$/ml. of 7-chloro-5a(11a)-dehydrotetracycline.

EXAMPLE 5

Example 4 is repeated, using the same medium containing 2$\gamma$/ml. of riboflavin. The mash is found to contain 760$\gamma$/ml. of chlortetracycline and 9200$\gamma$/ml. of 7-chloro-5a(11a)-dehydrotetracycline.

EXAMPLE 6

A 200 milliliter portion of S1308 mash assaying 3940 gammas of 7-chloro-5a(11a)-dehydrotetracycline per milliliter, prepared as in Example 4, is adjusted to pH 1.5 with concentrated hydrochloric acid and filtered. The filter cake is reslurried with 200 milliliters of water at 40° C., adjusted to pH 1.5, and filtered. To the combined filtrates, 54 grams of sodium chloride is added, and the resulting solution is extracted with three 60 milliliter portions of n-butanol. The combined butanol extracts are concentrated to about 17 milliliters, saturated with water, and filtered. This filtrate is put on a 2 x 12" Celite column which contains ½ milliliter of pH 2 water (HCl) per gram of Celite. The column is then developed with a mixture of 80% n-butanol-20% chloroform saturated with 0.01 N HCl. A total of 34 ten milliliter fractions is collected. On the basis of spectrophotometric assays, the antibiotic-rich cuts, 12–23, are combined, concentrated in the presence of water to give an aqueous solution, and freeze-dried. The crude thus obtained is crystallized from 1 milliliter of methanol. The crystals are filtered, washed with 50–50 methanol-ether, and then with ether alone. The product is vacuum dried at 40° C. to yield 128 milligrams of 7-chloro-5a(11a)-dehydrotetracycline assaying 927 gammas per milligram, representing a 16% weight yield from mash.

7-chloro-5a(11a) - dehydrotetracycline hydrochloride: $[\alpha]_D^{25}$ +15.5° (0.65% in 0.03 N HCl): $\lambda_{max}$ 221 m$\mu$, $\epsilon$ 27,500; $\lambda_{max}$ 251 m$\mu$, $\epsilon$ 23,000; $\lambda_{max}$ 375 m$\mu$, $\epsilon$ 4,300. Analysis. Found for $C_{22}H_{22}N_2Cl_2O_3$: C, 51.23; H, 5.12; N, 5.21; Cl, 13.82; O (Unterzaucher), 24.54; loss on drying, 0; ash, 0.

EXAMPLE 7

One gram of the free base obtained in Example 6 is slurried in 3 milliliters of methanol, and concentrated hydrochloric acid is added to effect solution. After filtering, the pH of the solution is adjusted to 4.0 with saturated sodium carbonate; crystals form rapidly. The hydrochloride crystals are filtered, washed with an ether-methanol mixture and finally with ether alone. The vacuum dried product weighs 500 milligrams.

EXAMPLE 8

A prepared mixture containing 75% 7-chloro-5a(11a)-dehydrotetracycline and 25% chlortetracycline is recrystallized by the above procedure to give a product which contains less than 2% chlortetracycline, as determined by fluorometric assay.

EXAMPLE 9

A 102 milligram portion of the neutral base is dissolved in 0.17 milliliter of dimethylformamide and 0.34 milliliter of water is added. The crystals which form rapidly are filtered, washed twice with water, and vacuum dried at 40° C. to give a yield of 78 milligrams of neutral 7-chloro-5a(11a)-dehydrotetracycline.

EXAMPLE 10

One gram of the neutral base is dissolved in a sufficiently small quantity of n-butanol to form a near saturated solution. The solution is then filtered, adjusted to pH 1.5 with concentrated hydrochloric acid, and ether is added until a slight permanent turbidity forms. The mixture is seeded, then aged for 24 hours at room temperature, after which the crystalline product is filtered, washed with n-butanol, then ether, and dried in vacuum. A yield of 0.78 gram of 7-chloro-5a(11a)-dehydrotetracycline hydrochloride is obtained. The product is soluble in water, and gives a precipitate of silver chloride on treatment with silver nitrate.

EXAMPLE 11

The procedure of Example 4 is followed except that the medium used has less than about 50 parts per million of chloride ion. 5a(11a)-dehydrotetracycline is produced.

EXAMPLE 12

The procedure of Example 4 is followed except that the medium is modified so that it has more than 50 parts per million of bromide ions and less than 50 parts per million of chloride ions. 7-bromo-5a(11a)-dehydrotetracycline is produced. This product is four times as stable as bromtetracycline in hydrochloric acid at pH 0.7 at 100° C.

This application is a continuation-in-part of our co-pending application Serial No. 650,821, filed April 5, 1957, now abandoned.

We claim:
1. A compound selected from the group consisting of 5a(11a)-dehydrotetracyclines of the formula:

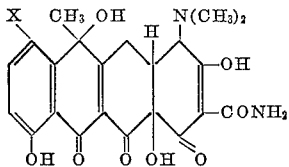

and non-toxic acid addition salts thereof wherein X is a member of the group consisting of hydrogen, bromine and chlorine.

2. 7-chloro-5a(11a)-dehydrotetracycline.
3. 7-bromo-5a(11a)-dehydrotetracycline.
4. 5a(11a)-dehydrotetracycline.
5. A process for producing 7-chloro-5a(11a)-dehydrotetracycline which comprises cultivating a strain of *Streptomyces aureofaciens* selected from the group consisting of those having American Type Culture Collection accession numbers 12748, 12749, 12750 and 12751 in an aqueous nutrient medium containing assimilable sources of carbohydrate, nitrogen and inorganic salts and containing at least 50 parts per million of chloride ions, under submerged aerobic conditions until substantial quantities of 7-chloro-5a(11a)-dehydrotetracycline are produced in said medium.

6. A process for producing 7-bromo-5a(11a)-dehydrotetracycline which comprises cultivating a strain of *Streptomyces aureofaciens* selected from the group consisting of those having American Type Culture Collection accession numbers 12748, 12749, 12750 and 12751 in an aqueous nutrient medium containing assimilable sources of carbohydrate, nitrogen and inorganic salts and containing at least 50 parts per million of bromide ions and less than 50 parts per million of chloride ions, under submerged aerobic conditions until substantial quantities of 7-bromo-5a(11a)-dehydrotetracycline are produced in said medium.

7. A process for producing 5a(11a)-dehydrotetracycline which comprises cultivating a strain of *Streptomyces aureofaciens* selected from the group consisting of those having American Type Culture Collection accession numbers 12748, 12749, 12750 and 12751 in an aqueous nutrient medium containing assimilable sources of carbohydrate, nitrogen and inorganic salts and being substantially free of available chloride ions, under submerged aerobic conditions until substantial quantities of 5a(11a)-dehydrotetracycline are produced in said medium.

References Cited in the file of this patent

UNITED STATES PATENTS

| | | |
|---|---|---|
| 2,709,672 | Petty | May 31, 1955 |
| 2,712,517 | Gourevitch | July 5, 1955 |
| 2,736,725 | Ritter | Feb. 28, 1956 |
| 2,739,924 | Lein | Mar. 27, 1956 |
| 2,744,932 | Waller et al. | May 8, 1956 |
| 2,763,591 | Hatch | Sept. 18, 1956 |
| 2,866,738 | Minieri | Dec. 30, 1958 |
| 2,895,993 | Stephens | July 21, 1959 |

OTHER REFERENCES

McCormick et al.: J. Am. Chem. Soc., vol. 80, pages 5572–3 (1958).